(No Model.)
J. W. EVANS.
PROCESS OF AND APPARATUS FOR SEPARATING NAPHTHA FROM OIL.
No. 281,039. Patented July 10, 1883.
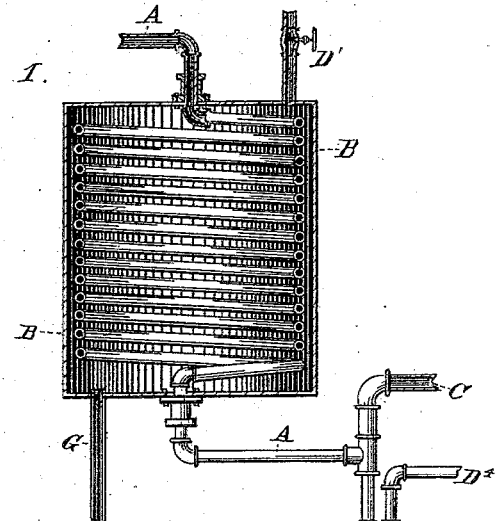
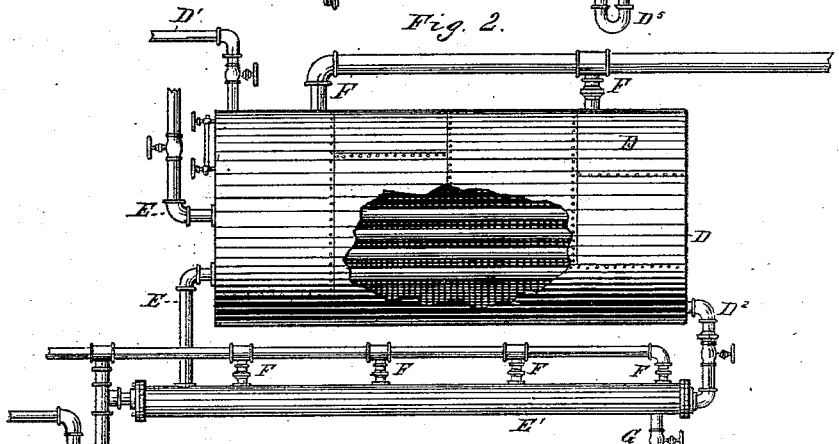
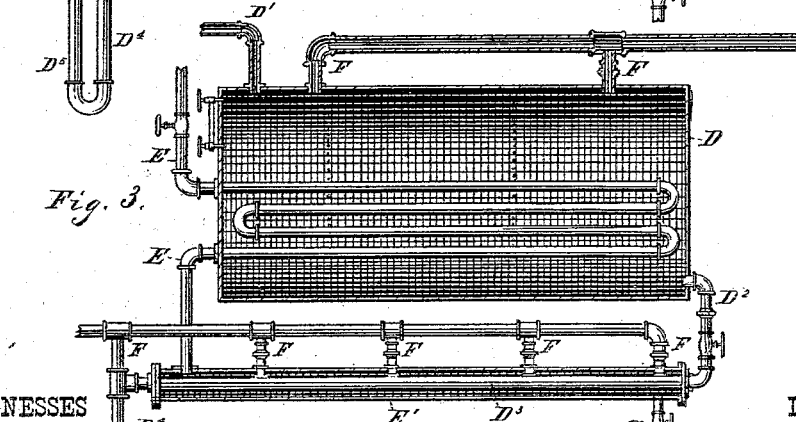
WITNESSES
INVENTOR
John W. Evans.
By Leggett & Leggett,
ATTORNEYS

UNITED STATES PATENT OFFICE.

JOHN W. EVANS, OF CLEVELAND, OHIO.

PROCESS OF AND APPARATUS FOR SEPARATING NAPHTHA FROM OIL.

SPECIFICATION forming part of Letters Patent No. 281,039, dated July 10, 1883.

Application filed December 1, 1881. (No model.)

*To all whom it may concern:*

Be it known that I, JOHN W. EVANS, of Cleveland, in the county of Cuyahoga and State of Ohio, have invented certain new and useful Improvements in Process of and Apparatus for Separating Naphtha from Oil; and I do hereby declare the following to be a full, clear, and exact description of the invention, such as will enable others skilled in the art to which it pertains to make and use it, reference being had to the accompanying drawings, which form part of this specification.

My invention relates to a process and mechanism for the purification of linseed and other seed oils where the naphtha process of extracting the oil from the seed is employed.

The naphtha process consists, essentially, in first crushing the seed and placing it in a receptacle, and then applying naphtha or benzine, which dissolves and extracts the oil. The product drawn off from the receiver is a mixture of benzine and seed-oil; and my invention has for its object the perfect separation of the benzine and seed-oil, so that the oil shall be merchantable, and the benzine restored, to be used again.

With this object in view my invention consists in a process of extracting the solvent from seed-oil, the said process consisting in subjecting the quantity of the mixture to the action of heat in a separator provided with vents for the escape of the vaporized solvent, and then subjecting small quantities of the mixture so treated to the action of heat in a secondary separator, in which the last traces of the solvent are removed.

My invention further consists in an apparatus for extracting the solvent from seed-oil, the said apparatus consisting of a primary and a secondary separator, constructed and operating substantially as described.

My invention further consists in an apparatus for extracting the solvent from seed-oil, the said apparatus consisting of a primary separator arranged to contain a quantity of the mixture, and provided with steam-pipes and with vents for the escape of the vaporized solvent, and of a secondary separator, arranged to have the mixture in the primary separator passed gradually through it, and provided with a heating-jacket and with vents for the escape of the vaporized solvent.

In the drawings, Figure 1 is a diagram illustrating the mechanism and process heretofore employed for separating the naphtha from the seed-oil. This drawing I show simply by way of explanation and comparison in pointing out the novelty and advantages of my improved process and mechanism. Fig. 2 is a side elevation, with part broken away, of an apparatus for carrying out my process; and Fig. 3 is a view in longitudinal vertical section of the device shown in Fig. 2.

My process, broadly stated, consists in placing the combined vegetable oil and naphtha, as it comes from the percolator, within a suitable closed container constructed with heating-pipes for steam or hot air, and with vents and collecting-pipes, both for the separated naphtha and the purified oil. Through the agency of the heat applied by the heating-pipes, the naphtha is evaporated and driven from the seed-oil. This naphtha escapes through the vent-pipes, which conduct it to suitable condensing and collecting apparatus. For general purposes I have also found a useful step in my process to consist in the provision of a second receptacle connected with the first, already described, by suitable pipes or conduits. This second receptacle is also constructed to heat the oil contained within it, and to permit of the escape and collection of the naphtha that may remain in the oil after it has left the primary separator.

Heretofore, as illustrated in Fig. 1 of the drawings, in separating naphtha from seed-oil, the apparatus used consisted in a long coil of pipe, A, contained within a closed heating-chamber, B. The mingled oil and naphtha, as it passed through the pipe A, became heated and to a degree separated; but no vent or means of escape for the naphtha was provided until the pipe A emerged from the heating-chamber B. This vent is represented at C in Fig. 1. It has never been possible by the employment of such process and mechanism to effect a separation of more than about ninety per cent. of the naphtha from the seed-oil, and the remaining naphtha had to be taken away by other processes, involving expense, time, and a material waste of naphtha.

By comparing my apparatus and process with the apparatus and process just described, and illustrated in Fig. 1 of the drawings, it will be seen that I have made at least two radical departures from the old system and mechanism. In the first place, instead of conducting the combined oil and naphtha through a pipe, A, surrounded by a heating medium, I place the oil in a receiver or container, D, and heat it by means of pipes E, into which steam or hot air (preferably steam) is injected; and, in the second place, instead of confining the oil and naphtha within the pipe A (as shown in Fig. 1) during all the time that it is subjected to the heating process, I provide one or more vents, F, whereby during the heating of the oil the separated naphtha can escape.

I will now describe my preferred form of mechanism for carrying out my improved process.

D is a closed container, made preferably from boiler-plate.

D' is an inlet-pipe, through which the combined seed-oil and naphtha, as produced in the percolator, is introduced into the receiver, or what may be termed the "prime separator," D. The inlet-pipe D' should be provided with a suitable stop-cock for regulating or preventing the admission of the combined oil and naphtha into the prime separator D.

E are steam or hot-air pipes of any suitable length, number, or construction. These pipes enter the prime separator D, for the purpose of heating its contents.

F F are vent or escape pipes, through which the naphtha-vapor passes and is conducted to suitable condensers and receivers.

$D^2$ is a pipe or conduit provided with a suitable stop-cock or valve. This pipe connects the prime separator D with the secondary separator $D^3$. The secondary separator, like the prime separator, is provided with a suitable number of vents, F, which connect with a pipe for conducting the naphtha-vapor to any suitable condensing and collecting apparatus. The secondary separator $D^3$ is surrounded by a chamber, E', into which steam or hot air from the pipe E is injected for the purpose of heating the contents of the secondary separator $D^3$, for the purpose of driving out all remaining naphtha from the oil, as will hereinafter more fully be described.

G is any suitable escape-pipe, provided with a valve or stop-cock, for permitting the escape of steam from the chamber E'.

$D^4$ is a pipe for receiving the purified oil from the secondary separator $D^3$, and this pipe is provided with a goose-neck or trap, $D^5$, for the purpose of preventing the escape of any naphtha-vapor through the pipe $D^4$.

The operation of my device is as follows:

The combined seed-oil and naphtha is run through the pipe D' into the prime separator, D until said prime separator is nearly full. The heat of the pipe E acts to heat the contents of the prime receiver D, and thus to evaporate and separate the greater portion of the naphtha from the oil. The naphtha, passing off as vapor, escapes through the vents F and F, and is conducted through a suitable pipe to any condensing and collecting apparatus. When the oil in the prime separator D has been freed from the major portion of its naphtha, it is allowed to escape through the pipe or conduit $D^2$ into the secondary separator $D^3$, where it is again subjected to the heat of the chamber E'. Here all the remaining naphtha is evaporated and allowed to escape through the vents F, as already described, and the purified oil is finally collected and escapes through the pipe $D^4$.

By the use of the apparatus specified a continuous operation can be carried on, inasmuch as the combined oil and naphtha can be introduced through the inlet D' as fast as the prime separator D becomes sufficiently empty, and by this means the secondary or finishing separator $D^3$ is kept in constant operation.

What I claim is—

1. A process for extracting the solvent from seed-oil, consisting in subjecting a quantity of the mixture to the action of heat in a separator provided with vents for the escape of the vaporized solvent, and then subjecting small quantities of the mixture so treated to the action of heat in a secondary separator, in which the last traces of the solvent are removed.

2. An apparatus for extracting the solvent from seed-oil, consisting of a primary and a secondary separator, constructed and operating substantially as described, substantially as set forth.

3. An apparatus for extracting the solvent from seed-oil, consisting of a primary separator arranged to contain a quantity of the mixture, and provided with steam-pipes, and with vents for the escape of the vaporized solvent, and of a secondary separator arranged to have the mixture in the primary separator passed gradually through it, and provided with a heating-jacket, and with vents for the escape of the vaporized solvent, substantially as set forth.

In testimony whereof I have signed my name to this specification in the presence of two subscribing witnesses.

JOHN W. EVANS.

Witnesses:
L. L. LEGGETT,
ALBERT E. LYNCH.